March 6, 1951     B. LIPNICKI ET AL     2,544,462
BRAKE ATTACHMENT
Filed Dec. 18, 1947
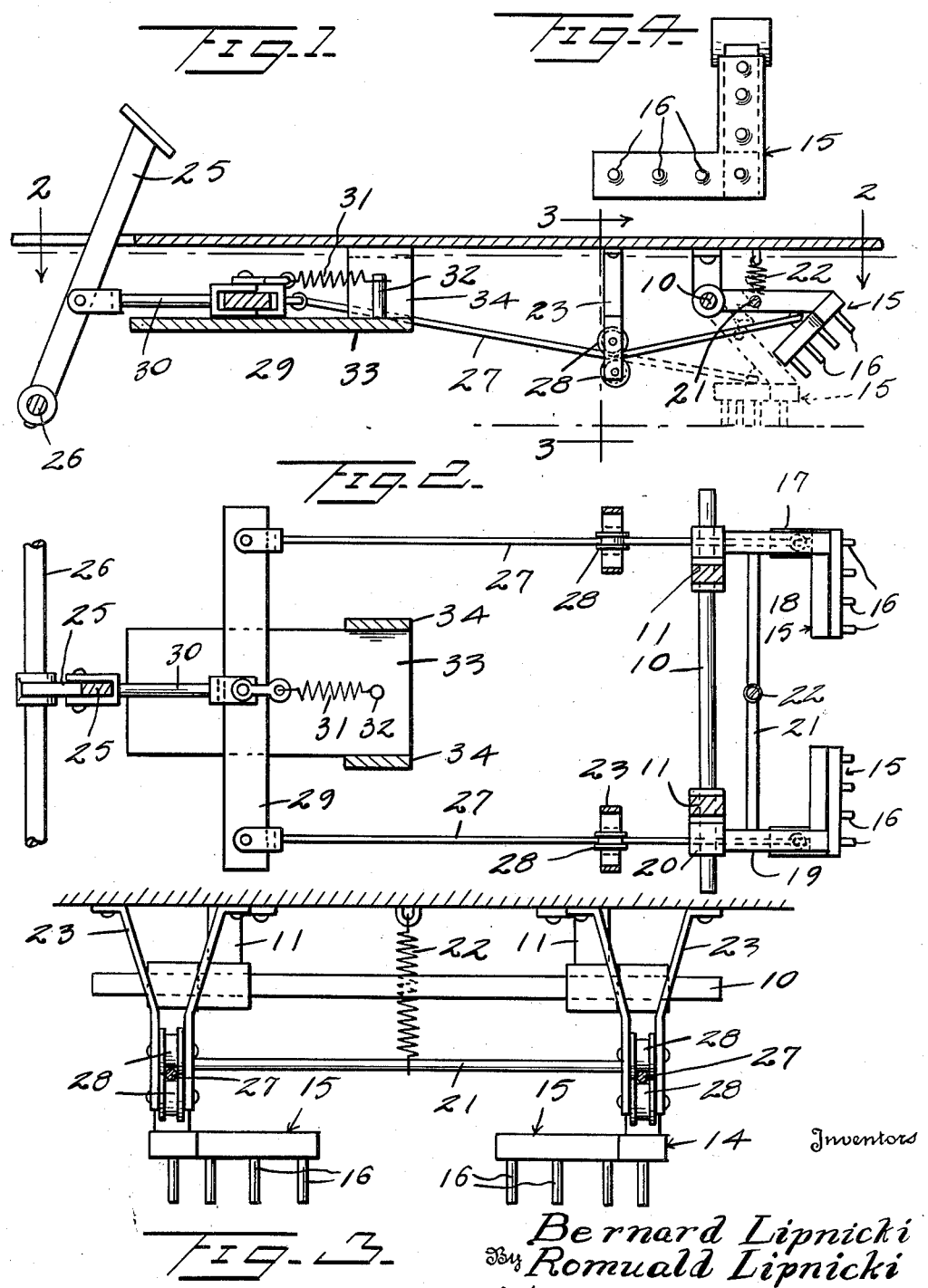
Inventors
Bernard Lipnicki
Romuald Lipnicki
By Kimmel & Crowell Attys.

Patented Mar. 6, 1951

2,544,462

UNITED STATES PATENT OFFICE 2,544,462

BRAKE ATTACHMENT

Bernard Lipnicki and Romuald Lipnicki,
Newington, Conn.

Application December 18, 1947, Serial No. 792,490

1 Claim. (Cl. 188—5)

This invention relates to a snow or ice brake for vehicles.

An object of this invention is to provide an improved brake for attachment to a vehicle which includes a pair of brake shoes adapted to be swung downwardly from a normally inoperative position to a lower operative or road engaging position for dragging on a snowy or icy surface so as to thereby stop the vehicle and to hold the vehicle against skidding.

Another object of this invention is to provide a device of this kind which can be readily attached to the present parts of the vehicle and will not affect the use and operation of the conventional wheel brake.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawing:

Figure 1 is a plan view, partly in horizontal section, of a brake structure constructed according to an embodiment of this invention.

Figure 2 is a sectional view taken on the line 2—2 of Figure 1.

Figure 3 is a fragmentary sectional view taken on the line 3—3 of Figure 1.

Figure 4 is a detailed rear elevation of one of the brake shoes.

Referring to the drawing, the numeral 10 designates generally a shaft which is adapted to be positioned beneath a vehicle in a horizontal position and the shaft 10 is adapted to be supported beneath the vehicle by means of a pair of hangers 11 which are adapted to be secured in any suitable manner to the under side of the vehicle frame structure. The shaft 10 has rockably mounted thereon adjacent the opposite ends thereof a pair of brake shoes, generally designated as 14. These shoes 14 include an L-shaped body 15 which has secured thereto a plurality of brake pins 16. The body 15 is adapted to be mounted with one side 17 thereof extending parallel with the length of the vehicle and the other side 18 thereof extending transversely or inwardly.

The body 15 is secured at an acute angle to an arm 19 which has a bushing 20 on its upper end and the bushing 20 is loosely mounted on the shaft 10. The shoes 14 are connected together by a bar 21 and a spring 22 is connected between bar 21 and the vehicle to normally maintain the shoes 14 in inoperative position.

The shoes 14 are adapted to be rocked downwardly to operative position by means of a pedal or operating member 25 which is rockably carried by a shaft 26 disposed at the forward portion of the vehicle. A pair of flexible connecting members 27 are connected at their rear ends to arms 19 and the connecting members 27 are secured at their forward ends to a transversely extending equalizing bar 29. The bar 29 at a point mid-way between the ends thereof is connected by means of a link or connecting member 30 to the pedal 25. A spring 31 is connected at its forward end to the bar 29 and is connected at its rear end to a fixed member 32 which is here shown as being secured to a horizontally disposed plate 33 which is dependingly carried by a pair of depending bars 34. The bars 34 are adapted to be secured in any suitable manner to a fixed portion of the under side of the vehicle. Each flexible member 27 engages between a pair of pulleys 28 which are carried by depending hangers 23 which are fixed to the vehicle.

In the use and operation of this device the brake structure is mounted by means of the hangers 11 and the bushings 20 beneath the chassis of the vehicle and the shaft 10 may be disposed either forwardly or rearwardly of the rear wheels of the vehicle. The pedal or operating member 25 is disposed at the forward portion of the vehicle, projecting through the floor boards in a position where it may be conveniently operated.

When the vehicle is travelling over snow or ice and the normal braking means for the wheels is ineffective, the pedal 25 may be rocked forwardly thereby swinging the brake shoes 14 downwardly to a position engaging the ground surface. Where the vehicle is moving over ice or the like and the wheels cannot be stopped by the normal braking means, the shoes 14 will provide an effective means engageable with the ice for maintaining the vehicle against skidding and for stopping the vehicle.

We claim:

A snow or ice brake attachment for vehicles comprising a shaft, hanger means supporting said shaft beneath a vehicle, a pair of L-shaped brake shoes disposed with one side thereof parallel with the length of the vehicle and the other side thereof extending inwardly a plurality of brake pins depending from said inwardly extending arms, an arm fixed to each brake shoe and rockably engaging said shaft adjacent the opposite ends thereof disposed forwardly of said shoes, spring means normally holding said shoes in upper inoperative position, a pedal forwardly of said shaft, a transversely disposed equalizing bar, a pair of flexible members connected between said bar and said arms, guide means for said flexible members, a link connected between the central portion of said bar and said pedal, and a spring fixed at one end to the vehicle and at the other end to the central portion of said bar for constantly urging the latter rearwardly.

BERNARD LIPNICKI.
ROMUALD LIPNICKI.

REFERENCES CITED

The following references are of record in the file of this patent:

UNITED STATES PATENTS

| Number | Name | Date |
|---|---|---|
| 1,503,522 | Taylor | Aug. 5, 1924 |
| 1,590,329 | Stefanick | June 29, 1926 |
| 1,876,286 | Gardello | Sept. 6, 1932 |
| 1,909,609 | Carlson | May 16, 1933 |
| 2,049,357 | Daignaut | July 28, 1936 |
| 2,147,451 | Messina | Feb. 14, 1939 |
| 2,282,202 | Nichol | May 5, 1942 |
| 2,319,297 | Cieri | May 18, 1943 |